(12) United States Patent
Brodnik et al.

(10) Patent No.: US 6,266,706 B1
(45) Date of Patent: Jul. 24, 2001

(54) FAST ROUTING LOOKUP SYSTEM USING COMPLETE PREFIX TREE, BIT VECTOR, AND POINTERS IN A ROUTING TABLE FOR DETERMINING WHERE TO ROUTE IP DATAGRAMS

(75) Inventors: Andrej Brodnik, Ljubljana (SI); Mikael Degermark, Luleå (SE); Svante Carlsson, Luleå (SE); Stephen Pink, Hässleby (SE)

(73) Assignee: Effnet Group AB, Bromma (SE)

( * ) Notice: Subject to any disclaimer, the term of this patent is extended or adjusted under 35 U.S.C. 154(b) by 0 days.

(21) Appl. No.: 09/062,106

(22) Filed: Apr. 17, 1998

(51) Int. Cl.[7] ................................................. G06F 15/173
(52) U.S. Cl. ...................... 709/242; 709/238; 709/239; 709/240; 709/243; 709/244; 370/238; 370/351
(58) Field of Search .................... 709/242, 238, 709/239, 240, 243, 244; 370/238, 351, 355; 359/124

(56) References Cited

U.S. PATENT DOCUMENTS

| | | | | |
|---|---|---|---|---|
| 6,032,190 | * | 2/2000 | Bremer et al. ...................... | 709/238 |
| 6,044,075 | * | 3/2000 | Le Boudec et al. ................. | 370/351 |
| 6,069,889 | * | 5/2000 | Feldman et al. ..................... | 370/351 |
| 6,147,989 | * | 11/2000 | Esaki et al. ........................... | 370/355 |
| 6,160,651 | * | 12/2000 | Chang et al. ......................... | 359/124 |

\* cited by examiner

*Primary Examiner*—Le Hien Luu
(74) *Attorney, Agent, or Firm*—James Ray & Associates

(57) ABSTRACT

In a method of IP routing lookup in a routing table, comprising entries of arbitrary length prefixes with associated next-hop information in a next-hop table, to determine where IP datagrams are to be forwarded, a representation of the routing table is stored, in the form of a complete prefix tree (7), defined by the prefixes of all routing table entries. Further, a representation of a bit vector (8), comprising data of a cut through the prefix tree (7) at a current depth (D), and an array of pointers, comprising indices to the next-hop table and to a next-level chunk, are stored. The bit-vector (8) is divided into bit-masks and a representation of the bit-masks is stored in a maptable. Then, an array of code words, each encoding a row index into the maptable and a pointer offset, and an array of base addresses are stored. Finally, the lookup is performed.

2 Claims, 7 Drawing Sheets

TABLE 1

| SITE | DATE | YEAR | ROUTING ENTRIES | LEAVES | NEXT-HOPS | SIZE (KB) | BUILD TIME | SPARSE CHUNKS | DENSE CHUNKS | DENSE+ CHUNKS | LEVEL 3 CHUNKS |
|---|---|---|---|---|---|---|---|---|---|---|---|
| MAE EAST | JAN 9 | '97 | 32732 | 58714 | 56 | 160 | 99 MS | 1199 | 587 | 186 | 2 |
| MAE EAST | OCT 21 | '96 | 38141 | 36607 | 50 | 148 | 91 MS | 1060 | 593 | 149 | 4 |
| SPRINT | JAN 1 | '97 | 21797 | 43513 | 17 | 123 | 72 MS | 988 | 483 | 98 | 3 |
| PACBELL | JAN 28 | '97 | 18308 | 33250 | 2 | 99 | 49 MS | 873 | 357 | 67 | 0 |
| MAE WEST | JAN 1 | '97 | 12049 | 28273 | 51 | 86 | 46 MS | 775 | 312 | 42 | 3 |
| AADS | JAN 4 | '97 | 1109 | 5670 | 12 | 28 | 11 MS | 320 | 38 | 0 | 2 |

FIG. 8

TABLE 2

| PROCESSOR | CLOCK CYCLE | PRIMARY CACHE SIZE | LATENCY | SECONDARY CACHE SIZE | LATENCY | TERTIARY CACHE SIZE | LATENCY |
|---|---|---|---|---|---|---|---|
| ALPHA 21164 | 8 NS | 8 KBYTE | 6 NS | 96 KBYTE | 24 NS | 2 MBYTE | 72 NS |
| PENTIUM PRO | 5 NS | 8 KBYTE | 10 NS | 256 KBYTE | 30 NS | | |

FIG. 9

FAST ROUTING LOOKUP SYSTEM USING COMPLETE PREFIX TREE, BIT VECTOR, AND POINTERS IN A ROUTING TABLE FOR DETERMINING WHERE TO ROUTE IP DATAGRAMS

FIELD OF THE INVENTION

The present invention relates generally to a method and system of IP (internet protocol) routing lookups in a routing table, comprising entries of arbitrary length prefixes with associated next-hop information in a next-hop table, to determine where IP datagrams are to be forwarded.

DESCRIPTION OF THE PRIOR ART

The Internet is an interconnected set of networks, wherein each of the constituent networks retains its identity, and special mechanisms are needed for communication across multiple networks. The constituent networks are referred to as subnetworks.

Each subnetwork in the Internet supports communication among the devices connected to that subnetwork. Further, subnetworks are connected by devices referred to as inter-working units (IWUs).

A particular IWU is a router, which is used to connect two networks that may or may not be similar. The router employs an internet protocol (IP) present in each router and each host of the network.

IP provides a connectionless or datagram service between stations.

Routing is generally accomplished by maintaining a routing table in each station and router that indicates, for each possible destination network, the next router to which the IP datagram should be sent.

IP routers do a routing lookup in a routing table to determine where IP datagrams are to be forwarded. The result of the operation is the next-hop on the path towards the destination. An entry in a routing table is conceptually an arbitrary length prefix with associated next-hop information. Routing lookups must find the routing entry with the longest matching prefix.

Since IP routing lookups have been inherently slow and complex, operations with prior art solutions have led to a proliferation of techniques to avoid using them. Various link layer switching technologies below IP, IP layer bypass methods (disclosed by the Proceedings of the Conference on Computer Communications (IEEE Infocom), San Francisco, Calif., March 1996; Proceedings of Gigabit Network Workshop, Boston, April 1995; and Proceedings of ACM SIGCOMM '95, p. 49–58, Cambridge, Mass., August 1995), and the development of alternative network layers based on virtual circuit technologies such as asynchronous transfer mode (ATM), are to some degree results of a wish to avoid IP routing lookups.

The use of switching link layers and flow or tag switching architectures below the IP level adds complexity and redundancy to the network.

Most current IP router designs use caching techniques wherein the routing entries of the most recently used destination addresses are kept in a cache. The technique relies on there being enough locality in the traffic so that the cache hit rate is sufficiently high and the cost of a routing lookup is amortized over several packets. These caching methods have worked well in the past. However, as the current rapid growth of the Internet increases the required size of address caches, hardware caches may become uneconomical.

Traditional implementations of routing tables use a version of Patricia trees (disclosed by the Journal of the ACM, 15(4): 514–534, October 1968), a data structure invented almost thirty years ago, with modifications for longest prefix matching.

A straightforward implementation of Patricia trees for routing lookup purposes, for example in the NetBSD 1.2 implementation, uses 24 bytes for leaves and internal nodes. With 40,000 entries, the tree structure alone is almost 2 megabytes, and in a perfectly balanced tree 15 or 16 nodes must be traversed to find a routing entry.

In some cases, due to the longest matching prefix rule, additional nodes need to be traversed to find the proper routing information as it is not guaranteed that the initial search will find the proper leaf. There are optimizations that can reduce the size of a Patricia tree and improve lookup speeds. Nevertheless, the data structure is large and too many expensive memory references are needed to search it. Current Internet routing tables are too large to fit into on-chip caches and off-chip memory references to DRAMs are too slow to support required routing speeds.

An early work on improving IP routing performance by avoiding full routing lookups (disclosed by the proceedings of the Conference on Computer Communication (IEEE Infocom), New Orleans, La., March 1988) found that a small destination address cache can improve routing lookup performance by at least 65 percent. Less than 10 slots were needed to get a hit rate over 90 percent. Such small destination address caches are not sufficient with the large traffic intensities and the number of hosts in today's Internet.

ATM (asynchronous transfer mode) avoids doing routing lookups by having a signaling protocol that passes addresses to the network during connection setup. Forwarding state, accessed by a virtual circuit identifier (VCI), is installed in switches along the path of the connection during setup. ATM cells contain the VCI which can then be used as a direct index into a table with forwarding state or as the key to a hash function. The routing decision is simpler for ATM. However, when packet sizes are larger than 48 bytes, more ATM routing decisions need to be made.

Tag switching and flow switching (disclosed by the Proceedings of the Conference on Computer Communications (IEEE Infocom), San Francisco, Calif., March 1996) are two IP bypass methods that are meant to be operated over ATM. The general idea is to let IP control link-level ATM hardware that performs actual data forwarding. Special purpose protocols (disclosed by Request for Comments RFC 1953, Internet Engineering Task Force, May 1996) are needed between routers to agree on what ATM virtual circuit identifiers to use and which packet should use which VCI.

Another approach with the same goal of avoiding IP processing is taken in the IP/ATM architecture (disclosed by the Proceedings of Gigabit Network Workshop, Boston, April 1995; and the Proceedings of ACM SIGCOMM '95, p. 49–58 Cambridge, Mass., August 1995), where an ATM backplane connects a number of line cards and routing cards. IP processing elements located in the routing cards process IP headers. When a packet stream arrives, only the first IP header is examined and the later packets are routed the same way as the first one The main purpose of these shortcuts seems to be to amortize the cost of IP processing over many packets.

IP router designs can use special-purpose hardware to do IP processing, as in the IBM router (disclosed by the Journal of High Speed Networks, 1(4): 281–288, 1993). This can be an inflexible solution. Any changes in the IP format or protocol could invalidate such designs. The flexibility of software and the rapid performance increase of general purpose processors makes such solutions preferable. Another hardware approach is to use CAMs to do routing lookups (disclosed by the Proceedings of the Conference on Computer Communications (IEEE Infocom), volume 3, p. 1382–1391, San Francisco, 1993). This is a fast but expensive solution.

BBN is currently building a pair of multi-gigabit routers that use general purpose processors as forwarding engines. Little information has been published so far. The idea, however, seems to be to use Alpha processors as forwarding engines and to do all IP processing in software. The Publication Gigabit networking, Addison-Wesley, Reading, Mass., 1993, shows that it is possible to do IP processing in no more than 200 instructions, assuming a hit in a route cache. The secondary cache of the Alpha is used as a large LRU (least recently used) cache of destination addresses. The scheme presumes locality in traffic patterns. With low locality, the cache hit rate could become too low and performance would suffer.

SUMMARY OF THE INVENTION

It is therefore an objective of the present invention to provide an improved IP routing lookup method and system for performing full routing lookups for each IP packet up to gigabit speeds, which method and system overcome the above mentioned disadvantages.

A further objective is to increase routing lookup speeds with a conventional microprocessor.

Another objective is to minimize lookup time in the forwarding table.

A further objective of the invention is to provide a data structure which can fit entirely in the cache of a conventional microprocessor.

Consequently, memory accesses will be orders of magnitude faster than if the data structure needs to reside in memory consisting of, for example, relatively slow DRAM.

These objectives are obtained with the IP routing lookup method and system according to the invention, which system is a data structure that can represent large routing tables in a very compact form and which can be searched quickly using few memory references.

BRIEF DESCRIPTION OF THE DRAWINGS

In order to explain the invention in more detail, and the advantages and features of the preferred embodiments of the invention will be described in detail below, reference will be made to the accompanying drawings, in which:

FIG. 8 is a table illustrating data on forwarding tables constructed from various routing tables, FIG. 9 is a table illustrating processor and cache data.

DETAILED DESCRIPTION OF THE INVENTION

Figure 1:
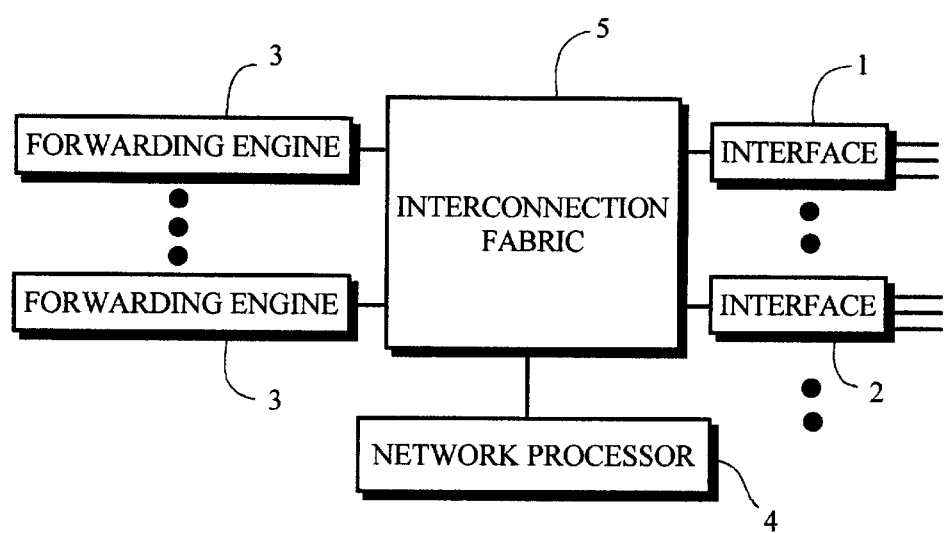
FIG. 1 is a schematic view of a router design.

With reference to FIG. 1, a router design comprises a number of network inbound interfaces 1, network outbound interfaces 2, forwarding engines 3, and a network processor 4, all of which are interconnected by a connection fabric 5. Inbound interfaces 1 send packet headers to the forwarding engines 3 through the connection fabric 5. The forwarding engines 3 in turn determine which outgoing interface 2 the packet should be sent to. This information is sent back to the inbound interface 1, which forwards the packet to the outbound interface 2. The only task of a forwarding engine 3 is to process packet headers. All other tasks such as participating in routing protocols, resource reservation, handling packets that need extra attention, and other administrative duties, are handled by the network processor 4.

Each forwarding engine 3 uses a local version of the routing table, a forwarding table, downloaded from the network processor 4 and stored in a storage means in the forwarding engine 3, to make its routing decisions. It is not necessary to download a new forwarding table for each routing update. Routing updates can be frequent but since routing protocols need some time to converge, forwarding tables can grow a little stale and need not change more than at most once per second (disclosed by Stanford University Workshop on Fast Routing and Switching, December 1996; http://tiny-tera.stanford.edu/Workshop_Dec96/).

The network processor 4 needs a dynamic routing table designed for fast updates and fast generation of forwarding tables. The forwarding tables, on the other hand, can be optimized for lookup speed and need not be dynamic.

To minimize lookup time, two parameters, the number of memory accesses required during lookup and the size of the data structure, have to be simultaneously minimized in the data structure in the forwarding table.

Reducing the number of memory accesses required during a lookup is important because memory accesses are relatively slow and usually the bottleneck of lookup procedures. If the data structure can be made small enough, it can fit entirely in the cache of a conventional micro processor. This means that memory accesses will be orders of magnitude faster than if the data structure needs to reside in a memory consisting of a relatively slow DRAM, as is the case for Patricia trees.

If the forwarding table does not fit entirely in the cache, it is still beneficial if a large fraction of the table can reside in the cache. Locality in traffic patterns will keep the most frequently used pieces of the data structure in the cache, so that most lookups will be fast. Moreover, it becomes feasible to use fast SRAM for the small amount of needed external memory. SRAM is expensive, and more expensive the faster it is. For a given cost, the SRAM can be faster if less is needed.

As secondary design goals, the data structure should need few instructions during lookup and keep the entities naturally aligned as much as possible to avoid expensive instructions and cumbersome bit-extraction operations.

To determine quantitative design parameters for the data structure, a number of large routing tables have been investigated, as described later. In these tables, fairly few of the 40,000 routing entries are distinct. If next-hops are identical, the rest of the routing information is also the same, and thus all routing entries specifying the same next-hop can share routing information. The number of distinct next-hops in the routing table of a router is limited by the number of other routers or hosts that can be reached in one hop, so it is not surprising that these numbers can be small even for large backbone routers. However, if a router is connected to, for instance, a large ATM network, the number of next-hops can be much higher.

In this embodiment, the forwarding table data structure is designed to accommodate $2^{14}$ or 16K different next-hops, which would be sufficient for most cases. If there are fewer than 256 distinct next-hops, so that an index into the next-hop table can be stored in a single byte, the forwarding tables described here can be modified to occupy considerably less space in another embodiment.

The forwarding table is essentially a tree with three levels. Searching one level requires one to four memory accesses. Consequently, the maximum number of memory accesses is twelve. However, with conventional routing tables, the vast majority of lookups requires searching one or two levels only, so the most likely number of memory accesses is eight or less.

Figure 2:
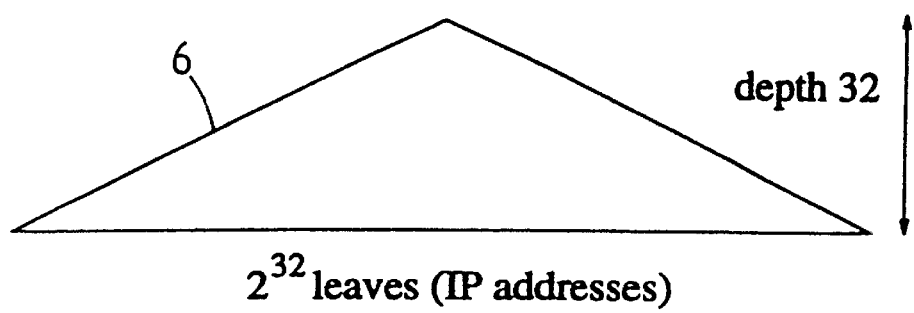
FIG. 2 is an illustrative view of a binary tree spanning the entire IP address space.

For the purpose of understanding the data structure, imagine a binary tree 6 that spans the entire IP address space, which is illustrated in FIG. 2. Its depth is 32, and the number of leaves is $2^{32}$, one for each possible IP address. The prefix of a routing table entry defines a path in the tree ending in some node. All IP addresses (leaves) in the subtree rooted at that node should be routed according to that routing entry. In this manner, each routing table entry defines a range of IP addresses with identical routing information.

Figure 3:
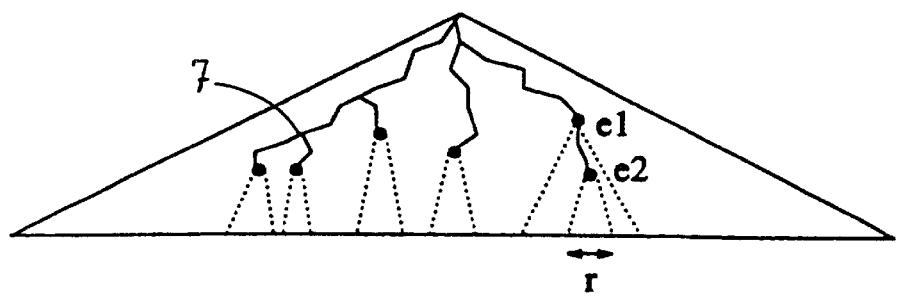
FIG. 3 is an illustrative view of routing entries defining ranges of IP addresses.

If several routing entries cover the same IP address, the rule of the longest match is applied; it states that for a given IP address, the routing entry with the longest matching prefix should be used. This situation is illustrated in FIG. 3; the routing entry e1 is hidden by e2 for addresses in the range r.

The forwarding table is a representation of the binary tree 6 spanned by all routing entries, a prefix tree 7. It is required that the prefix tree is full, i.e., that each node in the tree has either two or no children. Nodes with a single child must be expanded to have two children; the children added in this way are always leaves, and their next-hop information will be the same as the next-hop of the closest ancestor with next-hop information, or the "undefined" next-hop if no such ancestor exists.

Figure 4:
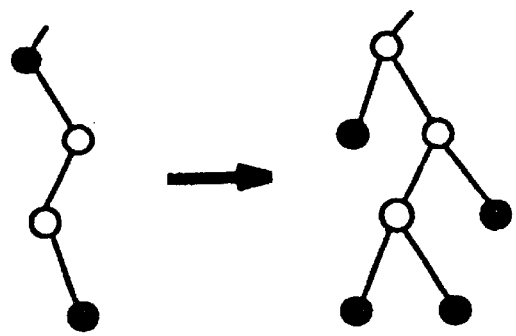
FIG. 4 is an illustrative view of a step of expanding the prefix tree to be full.

This procedure, illustrated In FIG. 4, increases the number of nodes in the prefix tree 7, but allows building a small forwarding table. However, it is not necessary to actually build the prefix tree to build the forwarding table. The prefix tree is used to simplify the description. The forwarding table can be built during a single pass over all routing entries.

A set of routing entries divides the IP address space into sets of IP addresses. The problem of finding the proper routing information is similar to the interval set membership problem (disclosed by the SIAM Journal on Computing, 17(1): 1093–1102, December 1988). In this case, each interval is defined by a node in the prefix tree and, therefore, has properties that can be used to compact the forwarding table. For instance, each range of IP addresses has a length that is a power of two.

Figure 5:
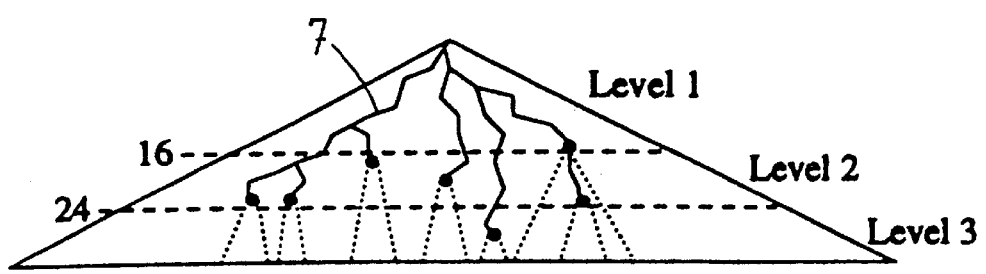
FIG. 5 is an illustrative view of three levels of the data structure according to the invention.

As shown in FIG. 5, level one of the data structure covers the prefix tree down to depth 16, level two covers depths 17 to 24, and level three depths 25 to 32. Wherever a part of the prefix tree extends below level 16, a level two chunk describes that part of the tree. Similarly, chunks at level three describe parts of the prefix tree that are deeper than 24. The result of searching a level of the data structure is either an index into the next-hop table or an index into an array of chunks for the next level.

At level 1 of the data structure in FIG. 5, for example, there is a cut through the prefix tree 7 at depth 16. The cut is stored in a bit-vector, with one bit per possible node at depth 16. Thus, $2^{16}$ bits=64 Kbits=8 Kbytes are required. To find the bit corresponding to the initial part of an IP address, the upper 16 bits of the address is used as an index into the bit-vector.

Figure 6:
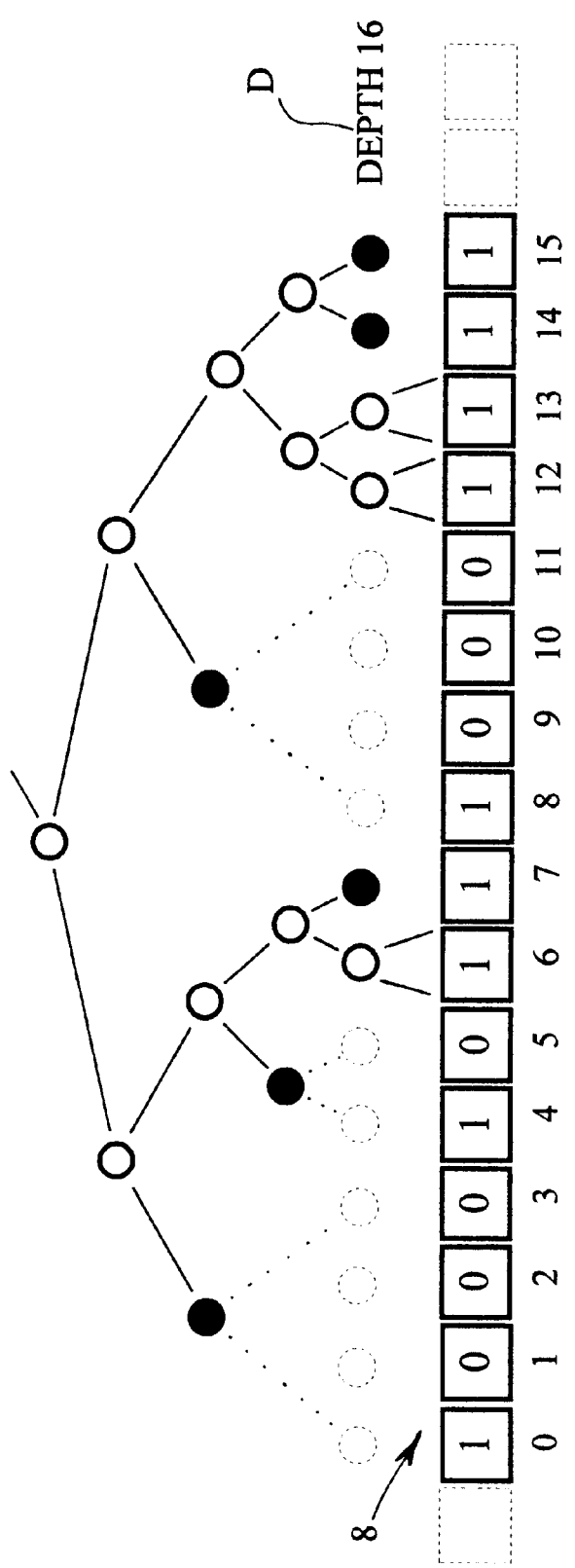
FIG. 6 is an illustrative view of a part of a cut through the prefix tree at depth 16.

When there is a node in the prefix tree at depth 16, the corresponding bit in the vector is set. Also, when the tree has a leaf at a depth less than 16, the lowest bit in the interval covered by that leaf is set. All other bits are zero. A bit in the bit vector can thus be:

(a) a one representing that the prefix tree continues below the out; a root head (bits 6, 12 and 13 in FIG. 6), or (b) a one representing a leaf at depth 16 or less; a genuine head (bits 0, 4, 7, 8, 14 and 15 in FIG. 6), or (c) zero, which means that this value is a member of a range covered by a leaf at a depth less than 16 (bits 1, 2, 3, 5, 9, 10 and 11 in FIG. 6). Members have the same next-hop as the largest head smaller than the member.

For genuine heads an index to the next-hop table has to be stored. Members will use the same index as the largest head smaller than the member. For root heads an index to the level two chunk, that represents the corresponding subtree, has to be stored. The head information is encoded in 16-bit pointers stored in an array. Two bits of the pointer encode what kind of pointer it is, and the 14 remaining bits are either indices into the next-hop table or into an array containing level two chunks.

Figure 7:
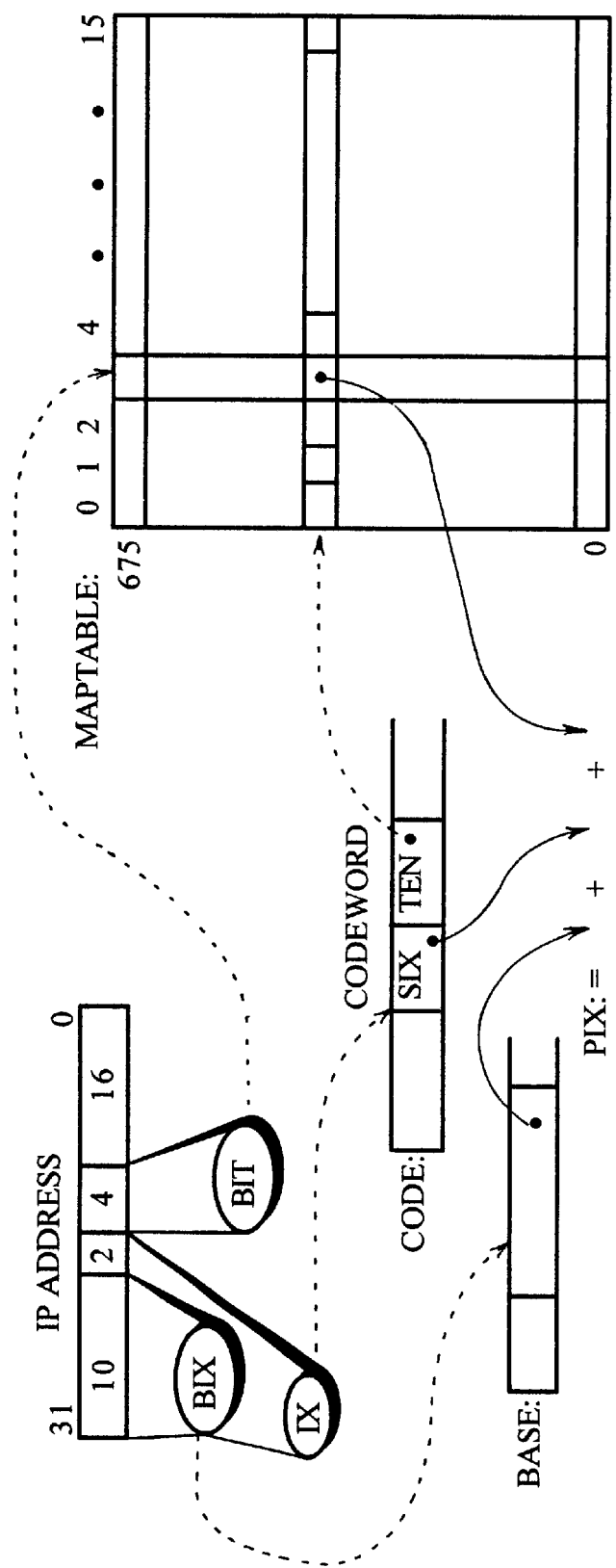
FIG. 7 is an illustrative view of a first level search of the data structure.

To find the proper pointer, the bit-vector is divided into it-masks of length 16 and there are $2^{12}=4096$ of those. Further, the position of a pointer in the array is obtained by adding three entities: a base index, a 6-bit offset and a 4-bit offset. Base index plus 6-bit offset determines where the pointers corresponding to a particular bit-mask are stored. The 4-bit offset specifies which pointer among those to retrieve. FIG. 7 shows how these entities are found. The following paragraphs elaborate on the procedure.

Since bit-masks are generated from a full prefix tree, not all combinations of the 16 bits are possible. A non-zero bit-mask of length 2n can be any combination of two bit-masks of length n or the bit-mask with value 1. Let a(n) be the number of possible non-zero bit-masks of length $2^n$. a(n) is defined by the recurrence $$a(0)=1,\ a(n)=1+a(n-1)^2$$

The number of possible bit-masks with length 16 are thus a(4)+1=678, the additional one is because the bit-mask can be zero. An index into a table with an entry for each bit-mask thus only needs 10 bits.

Such a table, maptable, is kept to map bit numbers within a bit-mask to 4-bit offsets. The offset specifies how many pointers to skip over to find the wanted one, so it is equal to the number of set bits smaller than the bit index. These offsets are the same for all forwarding tables, regardless of what values the pointers happen to have. The maptable is constant, it is generated once and for all.

The actual bit-masks are not needed, and instead of the bit-vector we keep an array of 16-bit code words consisting of a 10-bit index into the maptable plus a 6-bit offset. A 6-bit offset covers up to 64 pointers, so one base index per four code words is needed. There can be at most 64K pointers so the base indices need to be at most 16 bits (216=64K).

The following steps of pseudo code, in a procedure illustrated in FIG. 7, are required to search the first level of the data structure, wherein the array of code words is called code, and the array of base addresses is called base, ix is a first index part of the IP address in the array of code words, bit is a column index part of the IP address into the maptable, ten is a row index part of a codeword into the maptable, bix is a second index part of the IP address into the array of base addresses, and pix is a pointer into the array of pointers, comprising indices to the next-hop table as well as indices to the level two chunk.

ix := high 12 bits of IP address
    bit := low 4 of high 16 bits of IP address codeword
  := code[ix]
    ten := ten bits from codeword six := six bits from codeword
    bix := high 10 bits of IP address
    pix := base[bix] + six + maptable[ten][bit] pointer
  := level1_pointers[pix]

Thus, only a few bit extraction, array references, and additions are needed. No multiplication or division instructions are required except for the implicit multiplications when indexing an array.

Totally 7 bytes need to be accessed to search the first level: a two byte code word, a two byte base address, one byte (4 bits, really) in the maptable, and finally a two byte pointer. The size of the first level is 8K bytes for the code ward array, 2K bytes for the array of base indices, plus a number of pointers. The 5.3K bytes required by the maptable are shared among all three levels.

When the bit-mask is zero or has a single bit set, the pointer must be an index into the next-hop table. Such pointers can be encoded directly into the code word and thus the maptable need not contain entries for bit-masks one and zero. The number of maptable entries is thus reduced to 676 (indices 0 through 675). When the ten bits in the code word (ten above) are larger than 675, the code word represents a direct index into the next-hop table. The six bits from the code word are used as the lowest 6 bits in the index, and (ten-676) are the upper bits of the index. This encoding allows at most (1024–676)×2$^6$=22272 next-hop indices, which is more than the 16K we are designing for. This optimization eliminates three memory references when a routing entry is located at depth 12 or higher, and reduces the number of pointers in the pointer array considerably. The cost is a comparison and a conditional branch.

Levels two and three of the data structure consist of chunks. A chunk covers a subtree of height 8 and can contain at most 2$^8$=256 heads. A root head in level n–1 points to a chunk in level n.

There are three varieties of chunks depending on how many heads the imaginary bit-vector contains. When there are:

(a) 1–8 heads, the chunk is sparse and is represented by an array of the 8-bit indices of the heads, plus eight 16 bit pointers; a total of 24 bytes.
  (b) 9–64 heads, the chunk is dense It is represented analogously with level 1, except for the number of base indexes. The difference is that only one base index is needed for all 16 code words, because 6-bit offsets can cover all 64 pointers. A total of 34 bytes are needed, plus 18 to 128 bytes for pointers.
  (c) 65–256 heads, the chunk is very dense. It is represented analogously with level 1. The 16 code words and 4 base indexes give a total of 40 bytes. In addition, the 65 to 256 pointers require 130 to 512 bytes.

Dense and very dense chunks are searched analogously with the first level. For sparse chunks, the 1 to 8 values are placed in decreasing order. To avoid a bad worst-case when searching, the fourth value is examined to determine if the desired element is among the first four or last four elements. After that, a linear scan determines the index of the desired element, and the pointer with that index can be extracted. The first element less than or equal to the search key is the desired element. At most 7 bytes need to be accessed to search a sparse chunk.

Dense and very dense chunks are optimized analogously with level 1, as described. In sparse chunks, two consecutive heads can be merged and represented by the smaller if their next-hops are identical. When deciding whether a chunk is sparse or dense, this merging is taken into account so that the chunk is deemed sparse when the number of merged heads is 8 or less. Many of the leaves that were added to make the tree full will occur in order and have identical next-hops. Heads corresponding to such leaves will be merged in sparse chunks.

This optimization shifts the chunk distribution from the larger dense chunks towards the smaller sparse chunks. For large tables, the size of the forwarding table is typically decreased by 5 to 15 percent.

The data structure can accommodate considerable growth in the number of routing entries. There are two limits in the current design.

1. The number of chunks of each kind is limited to 2$^{14}$=16384 per level.

Table 1 shows that this is about 16 times more than is currently used. If the limit is ever exceeded, the data structure can be modified so that pointers are encoded differently to give more room for indices, or so that the pointer size is increased.

2. The number of pointers in levels two and three is limited by the size of the base indices.

The current implementation uses 16-bit base indices and can accommodate a growth factor of 3 to 5. If the limit is exceeded, it is straightforward to increase the size of base pointers to three bytes. The chunk size is then increased by 3 percent for dense chunks and 10 percent for very dense chunks. Sparse chunks are not affected.

It is clear that the data structure can accommodate a large increase in number of routing entries. Its size will grow almost linearly with the number of routing entries.

To investigate the performance of the forwarding tables, a number of IP routing tables were collected. Internet routing tables are currently available at the web site for the Internet Performance Measurement and Analysis (IPMA) project (http://www.ra.net/statistics/), and were previously made available by the now terminated Routing Arbiter project (http://www.ra.net/statistics/). The collected routing tables are daily snapshots of the routing tables used at various large Internet interconnection points. Some of the routing entries in these tables contain multiple next-hops. In that case, one of them was randomly selected as the next-hop to use in the forwarding table.

Table 1 in FIG. 8 shows data on forwarding tables constructed from various routing tables. For each site, it shows data and results for the routing table that generated the largest forwarding table. The heading "Routing entries" denotes the number of routing entries in the routing table, and "next-hops" denotes the number of distinct next-hops found in the table. "Leaves" denotes the number of leaves in the prefix tree after leaves have been added to make it full. "Build time" in Table 1 is the time required to generate the forwarding table from an in-memory binary tree representation of the routing table. Times were measured on a 333 MHz Alpha 21164 running DEC OSF1. Subsequent columns show the total number of sparse, dense, and very dense chunks in the generated table followed by the number of chunks in the lowest level of the data structure.

It is clear from Table 1 that new forwarding tables can be generated quickly. At a regeneration frequency of one Hz, less than one tenth of the Alpha's capacity is consumed. As described above, regeneration frequencies higher than 1 Hz are not required.

The larger tables in Table 1 do not fit entirely in the 96 Kbytes secondary cache of the Alpha. It is feasible, however, to have a small amount of very fast SRAM in the third level cache for the pieces that do not fit in the secondary cache, and thus reduce the cost of a miss in the secondary cache. With locality in traffic patterns, most memory references would be to the secondary cache.

An interesting observation is that the size of these tables are comparable to what it would take to just store all prefixes in an array. For the larger tables, no more than 5.6 bytes per prefix are needed. More than half of these bytes are consumed by pointers. In the Sprint table there are 33469 pointers that require over 65 Kbytes of storage. It is clear that further reductions of the forwarding table size could be accomplished by reducing the number of pointers.

Measurements on the lookup routine are done on a C function compiled with the GNU C-compiler gcc (disclosed by the Using and porting gnu cc. Manual, Free Software Foundation, November 1995, ISBN 1-882114-66-3). Reported times do not include the function call or the memory access to the next-hop table. The gcc generates a code that uses approximately 50 Alpha instructions to search one level of the data structure in the worst case. On a Pentium Pro, the gcc generates a code that uses 35 to 45 instructions per level in the worst case.

The following C-code function shows the code of the lookup function used in the measurements.

The level 1 codeword array is called intl and the base index array base1. The pointers in level 1 are stored in the array htab1.

Chunks are stored in the arrays cis, cid, cidd, where i is the level.

Base addresses and pointers for dense and very dense chunks are stored in the arrays baseid, baseidd, and htabid, htabidd, respectively.

```
/* lookup function for forwarding table */
#include "conf.h"
#include "forward.h"
#include "mtentry.h"
#include "mtable.h"
#include "bit2index.h"
#define TABLE_LOOKUP
#include "sparse.h"
#include "timing.h"
#include "lookup.h"
/* these macros work only if ip is a 32-bit unsigned int (unit32) */
#define EXTRACT(start,bits,ip) (((ip)<<(start))>>(32-(bits)))
#define GETTEN(m) (((m)<<22)>>22)
#define GETSIX(m) ((m)>>10)
#define bit2o(ix, bit)
((mt[(ix)][(bit)>>2]>>(((bit)&0x3)<<2))&0xf
/* lookup(ipaddr) -- index to routing table entry for ipaddr */
```

-continued

```
unsigned int lookup(unit32 ipaddr)
{
    uint32 ix;      /* index to codeword array   */
    unit32 code;    /* 16 bit codeword           */
    int32 diff;     /* difference from TMAX      */
    uint32 ten;     /* index to mt               */
    uint32 six;     /* six 'extra' bits of code  */
    int32 nhop;     /* pointer to next-hop       */
    uint32 off;     /* pointer offset            */
    uint32 hbase;   /* base for hash table       */
    uint32 pntr;    /* hash table entry          */
    int32 kind;     /* kind of pntr              */
    uint32 chunk;   /* chunk index               */
    uint8 *p,*q;    /* pointer to search sparse  */
    uint32 key;     /* search key in sparse      */
    /* timed from *HERE*  */
    ix = EXTRACT(0,12,ipaddr);
    code = int1[ix];
    ten = GETTEN(code);
    six = GETSIX(code);
    if ((diff=(ten-TMAX))>=0) {
        nhop = (six | (diff<<6));
        goto end;
    }
    off = bit2o(ten, EXTRACT(12,4,ipaddr));
    hbase = base1[ix>>2];
    pntr = htab1[hbase+six+off];
    if ((kind = (pntr & 0x3)) {
        chunk = (pntr>>2);
        if (--kind) {
            if (--kind) {
                key = EXTRACT(16,8,ipaddr);
                p = q = c2s[chunk].vals[0]);
                if ( *(p+3) > key)
                    p +=4;
                {;
                while( *p > key) {
                    p++;
                };
                pntr = c2s[chunk].rinfo[p - q];
            } else {
                ix = EXTRACT(16,4,ipaddr);
                code = c2dd[chunk] [ix];
                ten = GETTEN(code);
                six = GETSIX(code);
                if ((diff=(ten-TMAX))>=0)  {
                    nhop = (six | (diff<<6));
                    goto end;
                }
                hbase = htab2ddbase[(chunk<<2) |(ix>>2)];
                off = bit2o(ten, EXTRACT(20,4,ipaddr));
                pntr = htab2dd[hbase+six+off];
            }
        } else {
            ix= EXTRACT(16,4,ipaddr);
            code = c2d[chunk] [ix];
            ten = GETTEN(code);
            six = GETSIX(code);
            if ((diff=(ten-TMAX))>=0)  {
                nhop = (six | (diff<<6));
                goto end;
            }
            hbase = htab2dbase[chunk];
            off = bit2o(ten, EXTRACT(16,4,ipaddr));
            pntr = htab2d[hbase+six+off];
        }
        if ((kind = (pntr & 0x3))) {
            chunk = (pntr>>2);
            if (--kind) {
                If (--kind) {
                    key = EXTRACT(24,8,ipaddr);
                    p = q = c3s[chunk].vals[0]);
                    if ( *(p+3) > key) {
                        p +=4;
                    };
                    while( *p > key) {
                        p++;
                    };
                    pntr = c3s[chunk].rinfo[p - q];
```

```
    } else {
        ix = EXTRACT(24,4,ipaddr);
        code = c3dd[chunk] [ix];
        ten = GETTEN(code);
        six = GETSIX(code);
        if ((diff=(ten-TMAX))>=0) {
            nhop = (six | (diff<<6));
            goto end;
        }
    }
    off = bit2o(ten, EXTRACT(28,4,ipaddr));
    hbase = htab3ddbase[(chunk<<2) | (ix>>2)];
    pntr = htab3dd[hbase+six+off];
    }
} else {
    ix = EXTRACT(24,4,ipaddr);
    code = c3d[chunk] [ix];
    ten = GETTEN(code);
    six = GETSIX(code);
    if ((diff=(ten-TMAX))>=0) {
        nhop = (six | (diff<< 6));
        goto end;
    }
    off = bit2o(ten, EXTRACT(28,4,ipaddr));
    hbase = htab3dbase[chunk];
    pntr = htab3d[hbase+six+off];
    }
  }
}
nhop = (pntr >>2);
end:
    /* timed to HERE! */
    return nhop;
}
```

It is possible to read the current value of the clock cycle counter on both the Alpha and Pentium Pro processors. This facility has been used to measure lookup times with high precision: one clock tick is 5 nanoseconds at 200 MHz and 3 nanoseconds at 333 MHz.

Ideally, the entire forwarding table would be placed in cache so lookups would be performed with an undisturbed cache. That would emulate the cache behavior of a dedicated forwarding engine. However, measurements have been performed on conventional general-purpose workstations only and it is difficult to control the cache contents on such systems. The cache is disturbed whenever I/O is performed, an interrupt occurs, or another process starts running. It is not even possible to print out measurement data or read a new IP address from a file without disturbing the cache.

The method used performs each lookup twice and the lookup time for the second lookup is measured. In this way, the first lookup is done with a disturbed cache and the second in a cache where all necessary data have been forced into the primary cache by the first lookup. After each pair of lookups, measurement data are printed out and a new address is fetched, a procedure that again disturbs the cache.

The second lookup will perform better than lookups in a forwarding engine because data and instructions have moved into the primary cache closest to the processor. To get an upper limit on the lookup time, the additional time required for memory accesses to the secondary cache must be added to the measured times. To test all paths through the forwarding table, lookup time was measured for each entry in the routing table, including the entries added by the expansion to a full tree.

Average lookup times can not be inferred from these experiments because it is not likely that a realistic traffic mix would have a uniform probability for accessing each routing entry. Moreover, locality in traffic patterns will keep frequently accessed parts of the data structure in the primary cache and, thus, reduce the average lookup time. The performance figures calculated below are conservative because it is assumed that all memory accesses miss in the primary cache, and that the worst case execution time will always occur. Realistic lookup speeds would be higher.

Table I shows that there are very few chunks in level three of the data structure. That makes it likely that the vast majority of lookups need to search no more than two levels to find the next hop. Therefore, the additional time for memory accesses to the secondary cache is calculated for eight instead of the worst-case twelve memory accesses. If a significant fraction of lookups were to access those few chunks, they would migrate into the primary cache and all twelve memory accesses would become less expensive.

An experiment was performed on an Alpha 21164 with a clock frequency of 333 MHz; one cycle takes 3 nanoseconds. Accesses to the 8 Kbytes primary data cache completes in 2 cycles and accesses to the secondary 96 Kbytes cache require 8 cycles. See Table 2 in FIG. 9.

Figure 10:
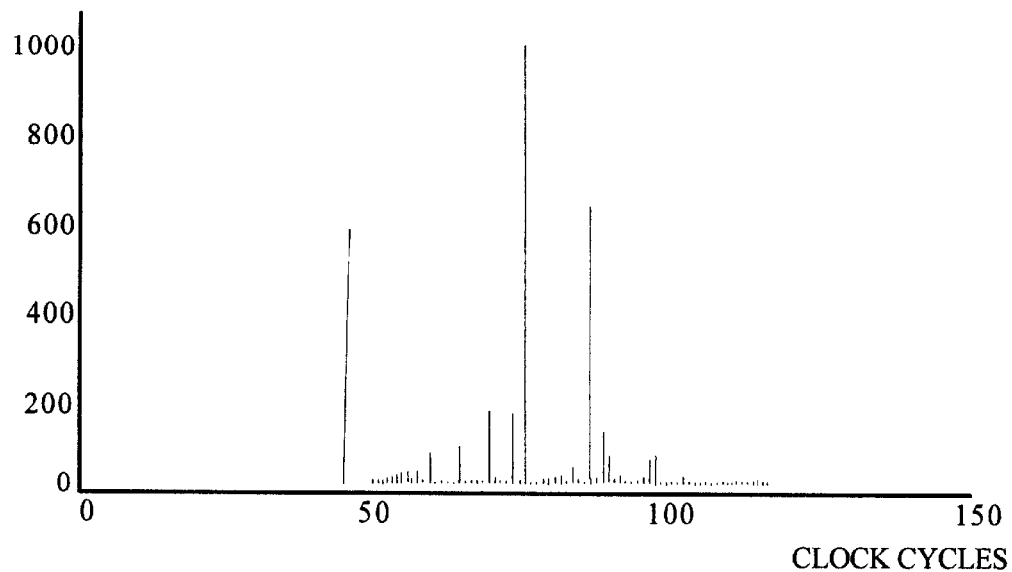
FIG. 10 is a diagram showing lookup time distribution for an Alpha 21164.

FIG. 10 shows the distribution of clock ticks elapsed during the second lookup for the Alpha on the Sprint routing table from January 1st. The fastest observed lookups require 17 clock cycles. This is the case when the code word in the first level directly encodes the index to the next-hop table. There are very few such routing entries. However, as each such routing entry covers many IP addresses, actual traffic may contain many such destination addresses. Some lookups take 22 cycles, which must be the same case as the previous are. Experiments have confirmed that when the clock cycle counter is read with two consecutive instructions, the difference is sometimes 5 cycles instead of the expected 10.

The next spike in FIG. 10 is at 41 clock cycles, which is the case when the pointer found in the first level is an index to the next-hop table. Traditional class B addresses fall in this category. Spikes at 52–53, 57, 62, 67 and 72 ticks correspond to finding the pointer after examining one, two, three, four or five values in a sparse level 2 chunk. The huge spikes at 75 and 83 ticks are because that many ticks are required to search a dense and very dense chunk, respectively. A few observations above 83 correspond to pointers found after searching a sparse level 3 chunk, probably due to variations in execution time. Cache conflicts in the secondary cache, or differences in the state of pipelines and cache system before the lookup, can cause such variations. The tail of observations above 100 clock cycles is either due to such variations or to cache misses. 300 nanoseconds should be sufficient for a lookup when all data are in the primary cache.

The difference between a data access in the primary cache and the secondary cache is 8−2=6 cycles. Thus, searching two levels of the data structure in the worst case requires 8×6=48 clock cycles more than indicated by FIG. 10. That means at most 100+48=148 cycles or 444 nanoseconds for the worst case lookup when 2 levels are sufficient. Thus the Alpha should be able to do at least 2.2 million routing lookups per second with the forwarding table in the secondary cache.

Another experiment was performed on a Pentium Pro with a clock frequency of 200 MHz; one cycle takes 5 nanoseconds. The primary 8 Kbytes cache has a latency of 2 cycles and the secondary cache of 256 Kbytes has a latency of 6 cycles. See Table 2.

Figure 11:
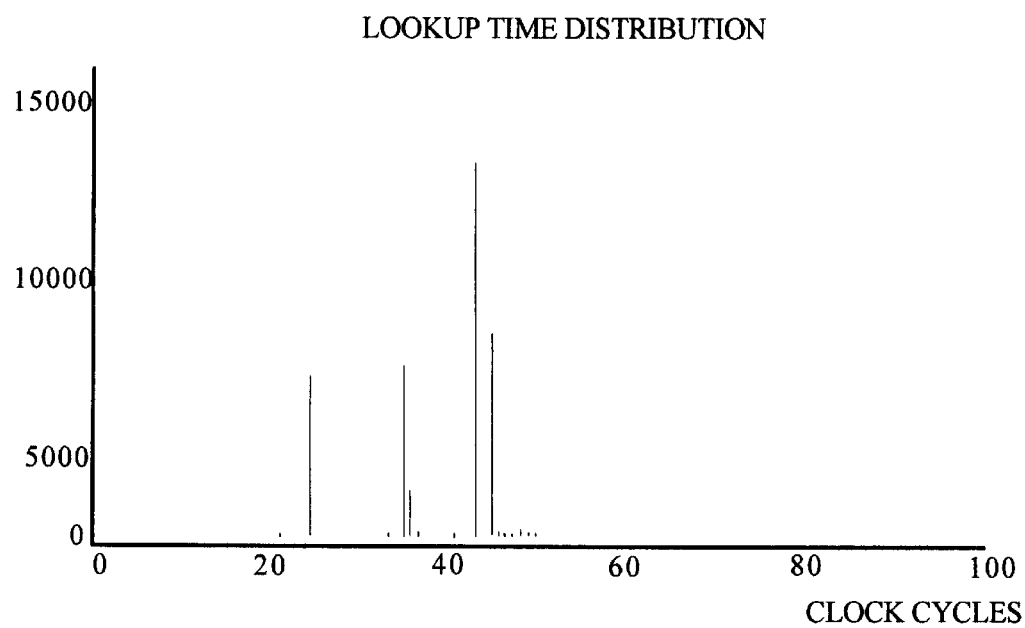
FIG. 11 is a diagram showing lookup time distribution for a Pentium Pro.

FIG. 11 shows the distribution of clock ticks elapsed during the second lookup for the Pentium Pro with the same forwarding table as for the Alpha 21164. The sequence of instructions that fetches the clock cycle counter takes 33 clock cycles. When two fetches occur immediately after each other, the counter values differ by 33. For this reason, all reported times have been reduced by 33.

The fastest observed lookups are 11 clock cycles, about the same speed as for the Alpha 21164 The spike corresponding to the case when the next-hop index is found immediately after the first level occurs at 25 clock cycles. The spikes corresponding to a sparse level 2 chunk are grouped closely together in the range 36 to 40 clock cycles. The different caching structure of the Pentium seems to deal better with linear scans than the caching structure of the Alpha 21164.

When the second level chunks are dense and very dense, the lookup requires 48 and 50 cycles, respectively. There are some additional irregular spikes up to 69, above which there are very few observations. It is clear that 69 cycles (345 nanoseconds) is sufficient to do a lookup when all data are in the primary cache.

The difference in access time between the primary and secondary caches is 20 nanoseconds (4 cycles). The lookup time for the Pentium Pro when two levels need to be examined is then at worst 69+8×4=101 cycles or 505 nanoseconds. The Pentium Pro can do at least 2.0 million routing lookups per second with the forwarding table in secondary cache.

It should be apparent that the present invention provides an improved IP routing lookup method and system that fully satisfies the aims and advantages set forth above. Although the invention has been described in conjunction with specific embodiments thereof, alternatives, modifications and variations are apparent to those skilled in the art.

In the above described embodiment, the lookup function is implemented in C programming language. For those skilled in the art of programming, it will be clear that other programming languages can be used. Alternatively, the lookup function can be implemented in hardware using standard digital design techniques, as also will be clear to those skilled in the art of hardware design.

For example, the invention is applicable for other computer system configurations than Systems using the Alpha 21164 or the Pentium Pro, other ways to cut the prefix tree, different number of levels in the tree, other ways to represent the maptable, and other ways to encode the code words.

Additionally, the invention can by utilized for Firewall routing lookups.

What is claimed is:

1. A method of IP routing lookup in a routing table to determine where IP datagrams are to be forwarded, said routing table comprising entries of arbitrary length prefixes with associated next-hop information in a next-hop table, said method comprising the steps of:

(a) storing in a storage means a representation of said routing table, in the form of a complete prefix tree (7), defined by prefixes of all of said entries, completed such that each node has one of no and two children, all of said children added are leaves with said next-hop information being same as a closest ancestor with said next-hop information or an undefined next-hop if no such closest ancestor exists;

(b) storing in said storage means a representation of a bit vector (8), said bit vector comprising data of a cut through said prefix tree (7) at a current depth (D) with one bit per possible node at said current depth, wherein said one bit is set when there is such a node in said prefix tree (7);

(c) storing in said storage means an array of pointers, for genuine heads an index to said next-hop table, and for root heads an index to a next-level chunk;

(d) dividing said bit-vector (8) into bit-masks of a certain length;

(e) storing in said storage means a maptable comprising a representation of said bit-masks that are possible;

(f) storing in said storage means an array of code words, each of said code words encoding a row index into said maptable and a pointer offset;

(g) storing in said storage means an array of base addresses;

(h) accessing a code word at a location corresponding to a first index part (ix) of an IP address in said array of code words;

(i) accessing a maptable entry part at a location corresponding to a column index part (bit) of said IP address and a row index part (ten) of said code word in said maptable;

(j) accessing a base address at a location corresponding to a second index part (bix) of said IP address in said array of base addresses; and (k) accessing a pointer at a location corresponding to said base address plus a pointer offset (six) of said code word plus said maptable entry part in said array of pointers.

2. A system for IP routing lookup in a routing table to determine where IP datagrams are to be forwarded, said routing table comprising entries of arbitrary length prefixes with associated next-hop information in a next-hop table, said system comprising:

(a) a routing table, in the form of a complete prefix tree (7), defined by prefixes of all of said entries, each node having one of no and two children, all of said children added are leaves with said next-hop information being same as a closest ancestor with said next-hop information or an undefined next-hop if no such closest ancestor exists;

(b) a representation of a bit vector (8), said bit vector comprising data of a cut through said prefix tree (7) at a current depth (D) with one bit per possible node at said current depth, wherein said one bit is set when there is such a node in said prefix tree (7);

(c) an array of pointers, for genuine heads an index to said next-hop table, and for root heads an index to a next-level chunk;

(d) said bit-vector (8) divided into bit-masks of a certain length;

(e) a maptable comprising a representation of said bit-masks that are possible;

(f) an array of code words, each code word encoding a row index into said maptable and a pointer offset; and (g) an array of base addresses.

* * * * *